Patented Dec. 13, 1932     1,890,852

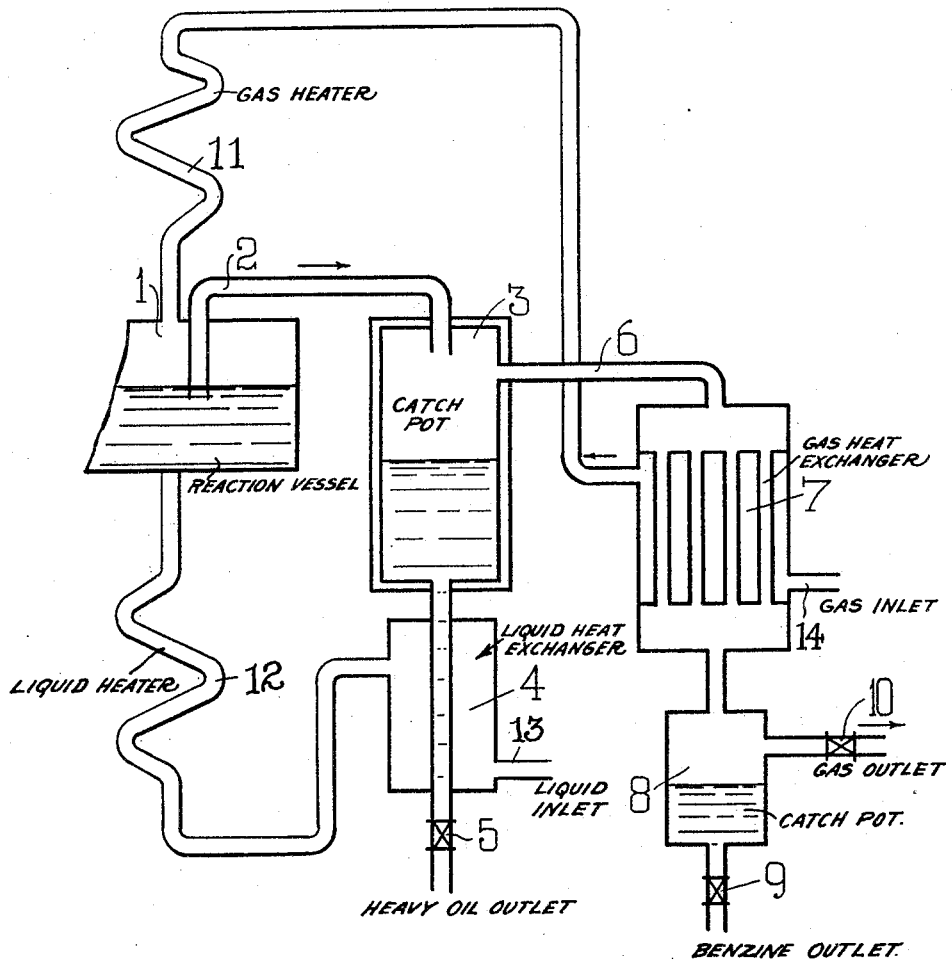

UNITED STATES PATENT OFFICE

CHARLES FREDERICK REED HARRISON, OF NORTON-ON-TEES, ENGLAND, ASSIGNOR TO IMPERIAL CHEMICAL INDUSTRIES LIMITED, OF LONDON, ENGLAND, A BRITISH COMPANY

SEPARATION OF GASEOUS AND LIQUID PRODUCTS

Application filed November 12, 1928, Serial No. 318,928, and in Great Britain December 31, 1927.

This invention relates to the separation of gaseous and liquid products and especially to the recovery of the reaction products from reactions conducted under high pressure e. g. to the separation of the gaseous and liquid products of the high pressure hydrogenation of carbonaceous materials at pressures of 100 atmospheres or over. Such gaseous and liquid products as are removed from the system will ultimately be brought down to atmospheric pressure, and in view of the difficulty of separating them while under pressure, it is the obvious and usual procedure to release the pressure on the mixture in some form of catch-pot and to separate the gases and liquid products at the low pressure existing within the vessel.

According to the present invention a mixture of gaseous and liquid reaction products is subjected to separation while still under high pressure and preferably at a high temperature, e. g. in a catch-pot, and the liquid and gaseous portions are then treated separately by expansion or pressure reduction and it may be cooling preferably to yield energy and heat.

My invention is based on the fact that the apparent complication caused by the introduction of a separating device into the high pressure zone of the system is more than offset by the advantages obtained, since I am enabled to avoid certain disadvantages of the known method viz. (1) the erosion of the valves subjected to the action of a mixture of liquid and gas at high pressure, and (2) the treatment of the low-pressure gas for recovery of volatile vapours which would have been condensed at high pressure.

The liquid portion is generally allowed to pass through a reducing valve and since it is no longer accompanied by gas the velocity of flow through the valve may be kept low and there will be no cause for erosion. The gaseous portion separated in the catch-pot at high pressure is cooled and/or scrubbed to remove condensable vapours and only after the removal of such is it allowed to expand to normal pressure. The gas may of course be expanded in an engine so as to recover as much as possible of the work of compression, while the pressure liquid previously referred to may be utilized to drive a Pelton wheel likewise for the recovery of a certain amount of power. For the purpose of driving a Pelton wheel, it is a considerable advantage to employ a liquid stream unaccompanied by gas.

The heat contained in the liquid and gas, when these are separated at a high temperature may be utilized to preheat the incoming materials.

In any case the liquid and gas should be decompressed in a comparatively cool state.

The invention also includes a process for fractionally separating the products of destructive hydrogenation by regulated cooling, without release of pressure.

In the preferred form of the invention we employ as the high pressure separating vessel or catch-pot the device described in our copending application Serial No. 318,927 of even date according to which a certain liquid level is automatically maintained in the separating vessel.

An important feature of the invention consists in separating gaseous and liquid products at a high temperature, so that the liquid contains little dissolved gas. The liquid may then be cooled and the valve controlling its escape will not suffer excessive wear either through erosion or the action of heat. The gases may also be cooled before reaching the valve which controls the rate of flow and hence the rate of admission of liquid and gas to the system.

The gas may also be circulated e. g. through a hydrogenation apparatus without releasing the pressure.

The accompanying drawing shows diagrammatically one method of working according to the invention.

Gas and liquid pass over from converter 1 through pipe 2 to catch pot 3 which is kept at a predetermined high temperature and under pressure. Liquid leaves at the base, is cooled by 4 which may be either a cooler or a heat exchanger, and is discharged cold at the valve 5.

The gas separated in 3 still contains benzine vapour and after passing through pipe 6 is cooled in the heat exchanger 7. Here benzine condenses and collects in the high pressure catch-pot 8 which is cold. Valve 9 releases cold benzine and valve 10 gas. The heat exchanger 7 and catch-pot 8 may also be replaced by a plurality of heat exchangers and catch-pots.

The gas for the reaction enters the heat exchanger 7 at 14 and, after heat exchange with the outgoing reaction gases passes to the heater 11 and so into the reaction vessel 1. The liquid enters the liquid heat exchanger 4 at 13 and passes thence to the liquid heater 12 and so into the reaction vessel 1.

I declare that what I claim is:—

1. In a process for the destructive hydrogenation of carbonaceous materials in the liquid phase, the steps of withdrawing all of both the liquid phase and vapour phase, reaction products in a single stream from a reaction zone into a separation zone maintained at substantially the same pressure as that maintained in the reaction zone, and at a temperature sufficient to maintain the major quantity of the lower boiling hydrocarbons in the vapour phase, allowing the reaction products to separate in said zone, withdrawing the vapourous products from said separation zone, cooling them whereby to condense the lower boiling hydrocarbons, and separating uncondensed gas and liquid under high pressure.

2. Process as set forth in claim 1 in which the temperature of the separation zone is maintained at a point sufficient to keep the separated liquid product substantially free from lower boiling hydrocarbons, and such liquid product is withdrawn and the pressure released thereon.

3. Process as set forth in claim 1 in which the separated liquid product is cooled prior to release of pressure thereon.

In witness whereof, I have hereunto signed my name this 31st day of October 1928.

CHARLES FREDERICK REED HARRISON.